(12) United States Patent
Al-Ali

(10) Patent No.: US 9,003,815 B2
(45) Date of Patent: Apr. 14, 2015

(54) AIR CONDITIONER HAVING AN AIR DEHUMIDIFYING DEVICE AND METHOD FOR OPERATING SUCH AN AIR CONDITIONER

(75) Inventor: Baker Al-Ali, Hamburg (DE)

(73) Assignee: Airbus Operations GmbH (DE)

( * ) Notice: Subject to any disclaimer, the term of this patent is extended or adjusted under 35 U.S.C. 154(b) by 105 days.

(21) Appl. No.: 13/202,872

(22) PCT Filed: Jan. 27, 2010

(86) PCT No.: PCT/EP2010/000485
§ 371 (c)(1),
(2), (4) Date: Nov. 17, 2011

(87) PCT Pub. No.: WO2010/094392
PCT Pub. Date: Aug. 26, 2010

(65) Prior Publication Data
US 2012/0060524 A1  Mar. 15, 2012

Related U.S. Application Data

(60) Provisional application No. 61/154,497, filed on Feb. 23, 2009.

(30) Foreign Application Priority Data

Feb. 23, 2009  (DE) .......................... 10 2009 010 151

(51) Int. Cl.
*F25D 17/06* (2006.01)
*B64D 13/00* (2006.01)
*B64D 13/06* (2006.01)

(52) U.S. Cl.
CPC ........ *B64D 13/00* (2013.01); *B64D 2013/0662* (2013.01); *Y02T 50/56* (2013.01)

(58) Field of Classification Search
CPC ........... F25B 2314/00; F25B 2314/003; F25B 2314/005–2314/006
USPC ...................... 62/93–94, 239, 271, 283; 95/21
See application file for complete search history.

(56) References Cited

U.S. PATENT DOCUMENTS 2,071,868 A * 2/1937 Von Lude ........................ 95/126
3,192,686 A * 7/1965 Berkey et al. ..................... 95/21

(Continued)

FOREIGN PATENT DOCUMENTS

| CN | 1812827 A | 8/2006 |
|---|---|---|
| DE | 4318169 A1 | 12/1993 |

(Continued)

OTHER PUBLICATIONS

Decision on Granting a Patent for Invention for Application No. 2011137316/11(055641) completed by The Federal Service for Intellectual Property, Patents and Trademarks (Rospatent) on Jan. 18 2013 (English Translation).

(Continued)

*Primary Examiner* — Frantz Jules
*Assistant Examiner* — Steve Tanenbaum
(74) *Attorney, Agent, or Firm* — Barnes & Thornburg LLP

(57) ABSTRACT

An aircraft air conditioning system has a fresh air line connected to a fresh air inlet for supplying fresh air to the air conditioning system and a sorption device disposed in the fresh air line which contains a sorbent for taking up moisture from the fresh air flowing through the fresh air line. The sorption device is adapted to expose the sorbent contained in the sorption device to ambient pressure surrounding an aircraft carrying the aircraft air conditioning system when the aircraft is flying for the purpose of regeneration of the sorbent. The sorption device is thermally connectable to a heat source that is adapted, when the aircraft is flying and while the sorbent contained in the sorption device is exposed to the ambient pressure, to supply thermal energy from the heat source to the sorbent contained in the sorption device for the purpose of assisting the regeneration.

15 Claims, 8 Drawing Sheets

(56) References Cited

U.S. PATENT DOCUMENTS

| | | | | |
|---|---|---|---|---|
| 3,825,212 | A | * | 7/1974 | Darges et al. ............... 244/118.5 |
| 4,650,575 | A | * | 3/1987 | White, Jr. ...................... 210/183 |
| 4,983,190 | A | * | 1/1991 | Verrando et al. .................. 95/11 |
| 5,279,609 | A | | 1/1994 | Meckler |
| 5,327,739 | A | * | 7/1994 | Ingersoll et al. .................. 62/78 |
| 5,429,663 | A | * | 7/1995 | Cassidy et al. .................... 95/21 |
| 5,560,195 | A | * | 10/1996 | Anderson et al. ............... 60/785 |
| 6,012,515 | A | * | 1/2000 | Stubbendorff et al. ........ 165/257 |
| 6,092,375 | A | * | 7/2000 | Denniston ......................... 62/94 |
| 6,629,427 | B1 | * | 10/2003 | Piao et al. ....................... 62/271 |
| 6,711,907 | B2 | * | 3/2004 | Dinnage et al. ................... 62/94 |
| 2003/0005719 | A1 | | 1/2003 | Mitani |
| 2006/0254420 | A1 | | 11/2006 | Monereau |

FOREIGN PATENT DOCUMENTS

| | | |
|---|---|---|
| DE | 19625820 11 | 1/1998 |
| DE | 60207642 T2 | 9/2006 |
| DE | 102006054560 A1 | 5/2008 |
| EP | 0745419 A2 * | 4/1996 |
| SU | 236998 A1 | 3/1969 |
| SU | 887278 A1 | 7/1981 |
| WO | 2003/067156 A2 | 8/2003 |

OTHER PUBLICATIONS (English translation) PCT International Search Report and Written Opinion for PCT/EP2010/000485 completed by the EP Searching.

Aug. 29, 2013 First Office Action—Chinese Application 201080009016.9; and DeQi's English Summary of the First Office Action Text.

Mar. 5, 2014 Second Office Action of counterpart Chinese Patent Application No. 201080009016.9; and DeQi's English Summary of the Second Office Action, issued by the State Intellectual Property Office of P.R. China.

* cited by examiner

AIR CONDITIONER HAVING AN AIR DEHUMIDIFYING DEVICE AND METHOD FOR OPERATING SUCH AN AIR CONDITIONER

CROSS-REFERENCE TO RELATED APPLICATIONS

This application is the U.S. national phase of PCT/EP2010/000485 filed Jan. 27, 2010. PCT/EP2010/000485 claims the benefit under the Convention of German Patent Application No. 102009010151.9 and U.S. Provisional Patent Application No. 61/154,497 both filed on Feb. 23, 2009.

FIELD OF THE INVENTION

The invention relates to an air conditioning system that is suitable for air-conditioning an aircraft and is equipped with an air dehumidifying device. The invention further relates to a method for operating such an air conditioning system, an aircraft equipped with such an air conditioning system, and an external aircraft air conditioning system that is equipped with such an air conditioning system and is suitable for air-conditioning an aircraft.

BACKGROUND

In a modern passenger aircraft the passenger cabin or sub-regions of the passenger cabin, the hold or sub-regions of the hold, the cockpit and the crew rest rooms form various climate zones that may be air-conditioned by means of an aircraft air conditioning system while the aircraft is operating both in the air and on the ground.

When the aircraft is operating in the air, the aircraft air conditioning system moreover ensures that the passenger cabin and at least sub-regions of the hold are maintained at a pressure that is higher than the reduced ambient pressure at cruising altitude of the aircraft. When the aircraft is flying, hot pressurized bleed air removed from the engine compressors or auxiliary engine compressors and/or ambient air is usually supplied to the aircraft air conditioning system. When the aircraft is operating on the ground with the engines switched off, on the other hand, the air conditioning system is supplied as a rule with ambient air. When the aircraft is operating on the ground, it is moreover possible to air-condition the various climate zones of the aircraft by means of an external aircraft air conditioning system that is connectable to the aircraft. The external aircraft air conditioning system is likewise usually supplied with ambient air.

In the air conditioning units of the aircraft air conditioning system and/or of the external aircraft air conditioning system the bleed air and/or the ambient air is cooled down to a desired low temperature. The air conditioned in the air conditioning units is conveyed as cooled fresh air into a conventionally internal mixer of the aircraft, where it is mixed with recirculation air that is extracted from the passenger cabin. The mixed air produced in the mixer from cold fresh air provided by the air conditioning packs and recirculation air extracted from the aircraft cabin is finally used to condition the various climate zones of the aircraft.

In order to prevent an accumulation of moisture in the interior of the aircraft and an icing-up of the air-carrying lines of the aircraft air conditioning system while the aircraft is flying, the fresh air supplied to the mixer of the aircraft air conditioning system should not exceed a specific moisture content. Since, as the air temperature drops, the humidity-absorbing capacity of the air also drops, a dehumidification of this air is achieved by the cooling of the bleed air and/or the ambient air in the air conditioning units of the aircraft air conditioning system or of the external aircraft air conditioning system. However, particularly when the aircraft is operating on the ground in warm and humid ambient conditions, an extreme cooling of the ambient air supplied to the aircraft air conditioning system or to the external aircraft air conditioning system is often needed to guarantee adequate air dehumidification. As a result of this, the air conditioning packs of the aircraft air conditioning system or of the external aircraft air conditioning system have to produce a very high cooling capacity, thereby leading to a high primary energy consumption of the aircraft air conditioning system or of the external aircraft air conditioning system.

SUMMARY

The invention is directed to the object of indicating an air conditioning system suitable for air conditioning an aircraft as well as a method for operating such an air conditioning system, which enable an energy-efficient dehumidification of fresh air supplied to the air conditioning system. The invention is further directed to the object of indicating an aircraft equipped with such an air conditioning system, a method for operating such an aircraft, and an external aircraft air conditioning system that is equipped with such an air conditioning system and is suitable for air-conditioning an aircraft.

This object is achieved by an air conditioning system having the features of claim 1, a method for operating an air conditioning system having the features of claim 6, an aircraft having the features of claim 11, a method for operating an aircraft having the features of claim 14, and an external aircraft air conditioning system having the features of claim 15.

An air conditioning system according to the invention, which may be integrated into an aircraft or into an external aircraft air conditioning system that is suitable for air-conditioning an aircraft while the aircraft is operating on the ground, comprises a fresh air line, which is connected to a fresh air inlet for supplying fresh air to the air conditioning system. The fresh air line of the air conditioning system according to the invention is preferably an ambient air line that is used to supply ambient air to the air conditioning system. However, if the air conditioning system is integrated at least partially into an aircraft, air that is provided by an external aircraft air conditioning system or is removed from an engine compressor or an auxiliary engine compressor of the aircraft may flow through the fresh air line. The fresh air flowing through the fresh air line may, optionally also in dependence upon the operating state of the air conditioning system, be supplied to air conditioning units or to a mixer of the air conditioning system or be conveyed directly into an aircraft area that is to be air-conditioned, such as for example a passenger cabin or a hold area.

In the fresh air line of the air conditioning system according to the invention a sorption device is disposed, which contains a sorbent for taking up moisture from the fresh air flowing through the fresh air line. In other words, the air conditioning system according to the invention comprises a dehumidifying device in the form of a sorption device, which is used to guarantee that the fresh air supplied to the air conditioning system through the fresh air line has a sufficiently low air humidity. The sorption device of the air conditioning system according to the invention may be disposed inside the aircraft, i.e. take the form of an internal aircraft component. Alternatively thereto, the sorption device may however be a component that is not permanently installed in the aircraft and is connected to the fresh air line of an internal aircraft air conditioning system only when required, for example when the aircraft is operating on the ground. In other words, the sorption device may also take the form of a component of a ground supply system of the aircraft and be provided only for temporary connection to an internal aircraft air conditioning system.

The sorption device of the air conditioning system according to the invention preferably takes the form of an adsorption device that contains a suitable adsorbent. When humid air flows through the adsorption device, i.e. the adsorbent contained in the adsorption device, the moisture contained in the air collects on the surface of the adsorbent. The fresh air flowing through the adsorption device is therefore dried. The adsorbent is preferably a fine-pored material, for example activated carbon, zeolite, silica gel or the like.

The air conditioning system according to the invention has the advantage that the fresh air supplied to the air conditioning system no longer has to be dehumidified by cooling the fresh air in the air conditioning units of the air conditioning system. It is therefore possible, particularly when the air conditioning system is operating in warm and humid ambient conditions, to significantly reduce the cooling capacity that is to be produced by the air conditioning units of the air conditioning system. The air conditioning system according to the invention may therefore be operated in a particularly energy-efficient manner.

The sorption device may be adapted to be thermally coupled to a heat source. By virtue of the thermal coupling to the heat source thermal energy may be supplied to the sorbent contained in the sorption device for the purpose of regeneration and/or assisting regeneration, i.e. for the desorption of water molecules attached to the surface of the sorbent. As a heat source a separate heating device may be used. However, if the sorption device is integrated into an aircraft, use is preferably made of a heat source that is already present on board the aircraft and preferably generates heat at least while the aircraft is flying. For example, a heat-generating component of the aircraft air conditioning system, of the aircraft hydraulic system or of the electronic systems of the aircraft may be used as a heat source.

Preferably a selective thermal coupling of the sorption device to the heat source is possible. This may be realized by corresponding heat flow control, for example by means of suitable valves or the like. Thermal energy may then be supplied temporarily to the sorption device and/or to the sorbent contained in the sorption device when the sorbent contained in the sorption device is to be regenerated. When fresh air is flowing through the sorption device, i.e. the sorption device is being operated in dehumidifying mode, the sorption device may on the other hand be uncoupled from the heat source so as not to disturb the dehumidifying mode of the sorption device. A temporary supply of thermal energy to a sorption device integrated into an aircraft is possible also if the heat source generates thermal energy only when the aircraft is operating in the air, not however when the aircraft is operating on the ground. The flying phases of the aircraft may then be used to regenerate the sorbent contained in the sorption device, while the sorption device may be operated in dehumidifying mode when the aircraft is operating on the ground.

The fresh air, as it flows through the sorption device, is heated by the sorption energy that is released during the attachment of air humidity to the sorbent contained in the sorption device. An air cooler is therefore preferably disposed in the fresh air line of the air conditioning system according to the invention. The air cooler is preferably positioned in the fresh air line, in relation to the direction of flow of the fresh air through the fresh air line, downstream of the sorption device. In the air cooler disposed downstream of the sorption device in the fresh air line the fresh air that is heated as it flows through the sorption device may be cooled back down to a desired low temperature. The air cooler may be configured for example in the form of a heat exchanger, in which the heated fresh air exiting from the sorption device is brought into contact with comparatively cool ambient air or with cold air provided by another cold air source.

The air conditioning system according to the invention may further comprise a fresh-air bypass line, which is connected to a further fresh air inlet for supplying fresh air to the air conditioning system. The fresh-air bypass line may open out into the fresh air line, in relation to the direction of flow of the fresh air through the fresh air line, downstream of the sorption device. An air conditioning system configured in such a way may be supplied for example in warm and humid ambient conditions with fresh air through the fresh air line. In cold and dry ambient conditions and/or when the aircraft is flying, the air conditioning system may on the other hand be supplied via the fresh-air bypass line with fresh air that does not have to be conveyed for dehumidification purposes through the sorption device. It is further possible for only a fraction of the fresh air that is to be supplied to the air conditioning system to be conveyed through the sorption device and dehumidified there, while another fraction of the fresh air to be supplied to the air conditioning system is conveyed through the fresh-air bypass line past the sorption device and in the non-dehumidified state into the air conditioning system. This enables a particularly flexible adjustment of the moisture content of the fresh air to be supplied to the air conditioning system.

Control of the fresh air stream from the fresh-air bypass line, and/or from a portion of the fresh air line that is situated, in relation to the direction of flow of the fresh air through the fresh air line, upstream of the opening of the fresh-air bypass line into the fresh air line, into a portion of the fresh air line situated, in relation to the direction of flow of the fresh air through the fresh air line, downstream of the opening of the fresh-air bypass line into the fresh air line may be effected with the aid of a suitable valve. For example, here a 3-way valve may be used, which is disposed in the fresh air line in the region where the fresh-air bypass line opens out into the fresh air line.

A feed device for feeding the fresh air through the fresh air line may be disposed in the fresh air line. As a feed device it is possible to use for example a blower or a compressor. In relation to the direction of flow of the fresh air through the fresh air line, the feed device is disposed preferably downstream of the sorption device in the fresh air line. If the air conditioning system according to the invention is provided with a fresh-air bypass line that opens out into the fresh air line, the feed device is disposed in the fresh air line, in relation to the direction of flow of the fresh air through the fresh air line, preferably downstream of the opening of the fresh-air bypass line into the fresh air line in order, depending on the operating state of the air conditioning system, to feed fresh air through the fresh air line and/or the fresh-air bypass line. In a method according to the invention for operating an air conditioning system, fresh air is conveyed through a fresh air line that is connected to a fresh air inlet. The fresh air conveyed through the fresh air line is preferably ambient air. Moisture contained in the fresh air flowing through the fresh air line is taken up by a sorbent, which is contained in a sorption device disposed in the fresh air line. In other words, in the method according to the invention for operating an air conditioning system fresh air supplied to the air conditioning system is dehumidified by means of a dehumidifying device configured in the form of a sorption device.

Alternatively or in addition thereto, the sorption device may be thermally coupled to a heat source in order to supply thermal energy to the sorbent contained in the sorption device for the purpose of regeneration.

The fresh air flowing through the fresh air line is preferably cooled by means of an air cooler that is disposed in the fresh air line, in relation to the direction of flow of the fresh air through the fresh air line, downstream of the sorption device.

In a preferred embodiment of the method according to the invention for operating an air conditioning system, for example when the aircraft is flying or in cold and dry ambient conditions fresh air is conveyed through a fresh-air bypass line connected to a further fresh air inlet. This fresh air is supplied to the fresh air line, in relation to the direction of flow of the fresh air through the fresh air line, downstream of the sorption device and is therefore conveyed past the sorption device into the air conditioning system.

The fresh air is fed through the fresh air line preferably by means of a feed device disposed in the fresh air line. In the case of an air conditioning system integrated into an aircraft, such an operation of the air conditioning system is meaningful particularly when the aircraft is operating on the ground with the engines switched off.

An aircraft according to the invention is equipped with an air conditioning system as described above, wherein the sorption device of the air conditioning system may be either likewise integrated into the aircraft or take the form of a component that is connectable to the air conditioning system only temporarily, for example when the aircraft is operating on the ground.

In the aircraft according to the invention, a sorption device of the air conditioning system that is integrated into the aircraft is disposed preferably in an unpressurized area of the aircraft, i.e. in an area of the aircraft that, when the aircraft is flying, is not maintained by the air conditioning system and/or a pressure control system of the air conditioning system at a higher pressure than the reduced ambient pressure. The sorption device of the air conditioning system is moreover preferably adapted to expose the sorbent material contained in the sorption device to the—compared to the atmospheric pressure on the ground—reduced ambient pressure when the aircraft is flying for the purpose of regeneration. In other words, the sorption device of the air conditioning system is preferably designed in such a way that, when the aircraft is flying, an unimpeded pressure compensation is possible between the sorption device and the unpressurized aircraft area and/or aircraft environment surrounding the sorption device and consequently the sorbent contained in the sorption device is exposed to the reduced ambient pressure that prevails when the aircraft is flying. At a cruising altitude of ca. 39,000 ft (ca. 11,900 m) this ambient pressure is for example only 0.2 bar. The reduced ambient pressure that prevails when the aircraft is flying has the effect that water molecules attached to the surface of the sorbent are desorbed and the sorbent is consequently regenerated, i.e. prepared for renewed attachment of water molecules. In this way the sorbent may be regenerated without the active supply of regeneration energy, i.e. passively.

In the aircraft according to the invention, the air conditioning system may further comprise a bleed air line, which is connected to an engine compressor or an auxiliary engine compressor of the aircraft. Warm air drawn from the engines and under increased pressure may be supplied through the bleed air line to the air conditioning system. The bleed air line may open out into the fresh air line, in relation to the direction of flow of the fresh air through the fresh air line, downstream of the sorption device. When the aircraft is flying or operating on the ground with the engines running, the air conditioning system may be supplied with engine bleed air through the bleed air line, whereas, when the aircraft is operating on the ground with the engines switched off, a fresh air supply to the air conditioning system may be guaranteed through the fresh air line. As an alternative to a fresh-air bypass line, the air conditioning system may be equipped with a bleed air line. It is however also possible to equip the air conditioning system with both a fresh-air bypass line and a bleed air line.

A suitable valve may be used to control the bleed air flow through the bleed air line and/or to control the fresh air flow through a portion of the fresh air line that is situated, in relation to the direction of flow of the fresh air through the fresh air line, upstream of the opening of the bleed air line into the fresh air line into a portion of the fresh air line that is situated, in relation to the direction of flow of the fresh air through the fresh air line, downstream of the opening of the bleed air line into the fresh air line. For example use may be made of a 3-way valve that is disposed in the fresh air line in the region where the bleed air line opens out into the fresh air line.

If the air conditioning system is provided with a fresh-air bypass line that opens out into the fresh air line, a feed device is disposed in the fresh air line, in relation to the direction of flow of the fresh air through the fresh air line, as described above, preferably downstream of the opening of the fresh-air bypass line into the fresh air line in order, depending on the operating state of the air conditioning system, to feed fresh air through the fresh air line and/or the fresh-air bypass line. If, on the other hand, the air conditioning system has merely a bleed air line that opens out into the fresh air line, the feed device may be disposed in the fresh air line, in relation to the direction of flow of the fresh air through the fresh air line, also upstream of the opening of the bleed air line into the fresh air line. For example, an arrangement of the feed device between the sorption device and the air cooler is conceivable.

In a method according to the invention for operating an aircraft, the sorbent contained in a sorption device integrated into the aircraft is preferably regenerated when the aircraft is flying in that it is exposed to the ambient pressure that prevails in the aircraft environment and an unpressurized area of the aircraft when the aircraft is flying.

Furthermore, in the method according to the invention for operating an aircraft, bleed air may be conveyed through a bleed air line connected to an engine compressor or an auxiliary engine compressor of the aircraft and may be supplied into the fresh air line, in relation to the direction of flow of the fresh air through the fresh air line, downstream of the sorption device. Supplying the air conditioning system with bleed air occurs preferably when the aircraft is flying or operating on the ground with the engine running.

An external aircraft air conditioning system according to the invention that is suitable for air-conditioning an aircraft is connectable to the aircraft and equipped with an air conditioning system as described above. The sorption device of the air conditioning system may take the form of a permanent component of the air conditioning system. Alternatively, however, the sorption device may take the form of a component that is connectable only temporarily to the air conditioning system and is connected only when required to the air conditioning system of the air conditioning system.

BRIEF DESCRIPTION OF DRAWINGS

There now follows a detailed description of preferred embodiments of the invention with reference to the accompanying diagrammatic drawings, which show FIG. 1 a first embodiment of an air conditioning system integrated into an aircraft, when the aircraft is operating on the ground, FIG. 2 the air conditioning system according to FIG. 1, when the aircraft is flying, FIG. 3 a second embodiment of an air conditioning system integrated into an aircraft, when the aircraft is operating on the ground, FIG. 4 the air conditioning system according to FIG. 3, when the aircraft is flying FIG. 5 a third embodiment of an air conditioning system integrated into an aircraft, when the aircraft is operating on the ground in humid ambient conditions, FIG. 6 the air conditioning system according to FIG. 5 when the aircraft is operating on the ground in dry ambient conditions, FIG. 7 the air conditioning system according to FIG. 5 when the aircraft is flying, the air conditioning system being supplied with bleed air, and FIG. 8 the air conditioning system according to FIG. 5 when the aircraft is flying, the air conditioning system being supplied with ambient air.

DETAILED DESCRIPTION OF DRAWINGS

Figure 1:
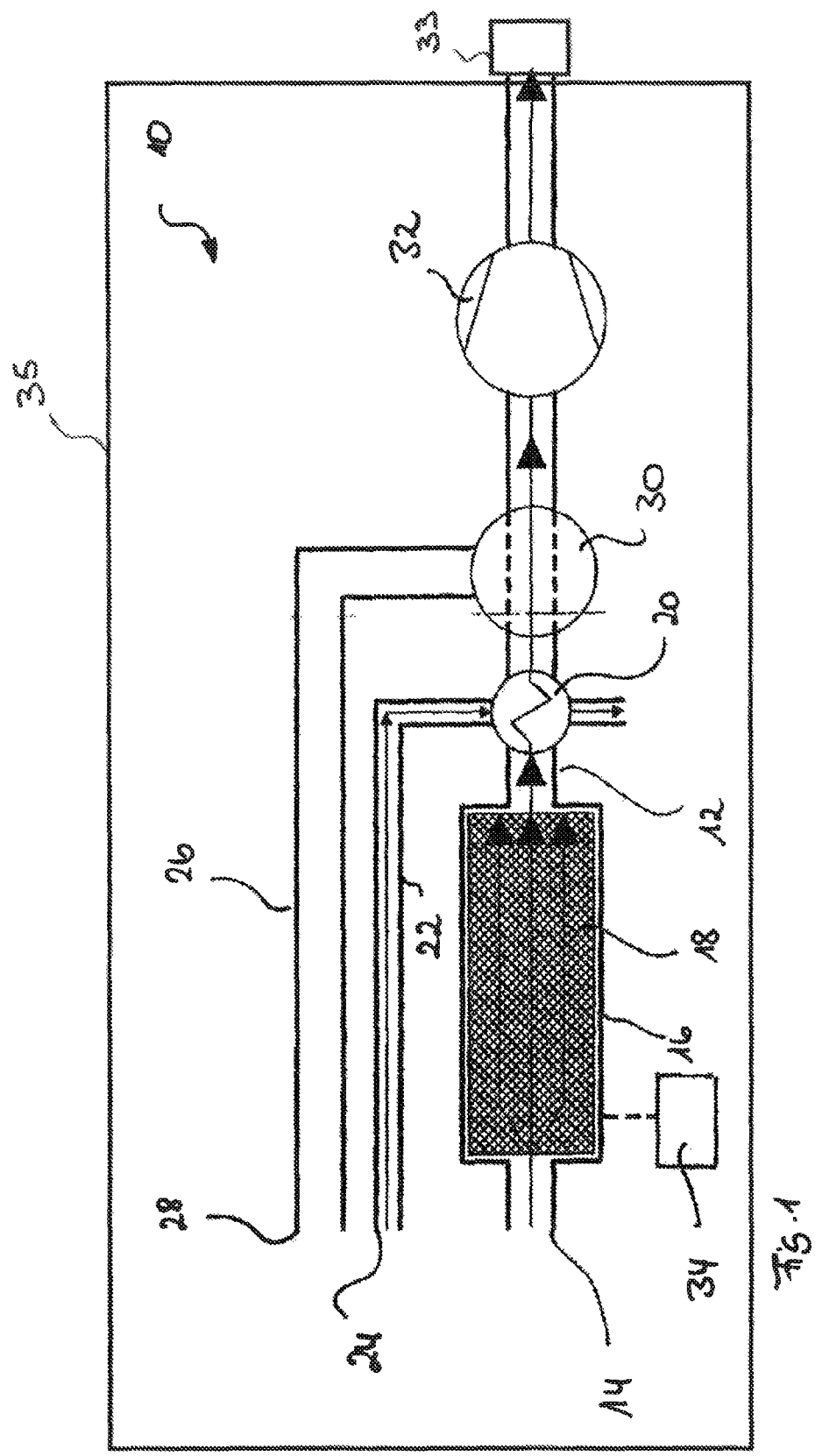
Figure 2:
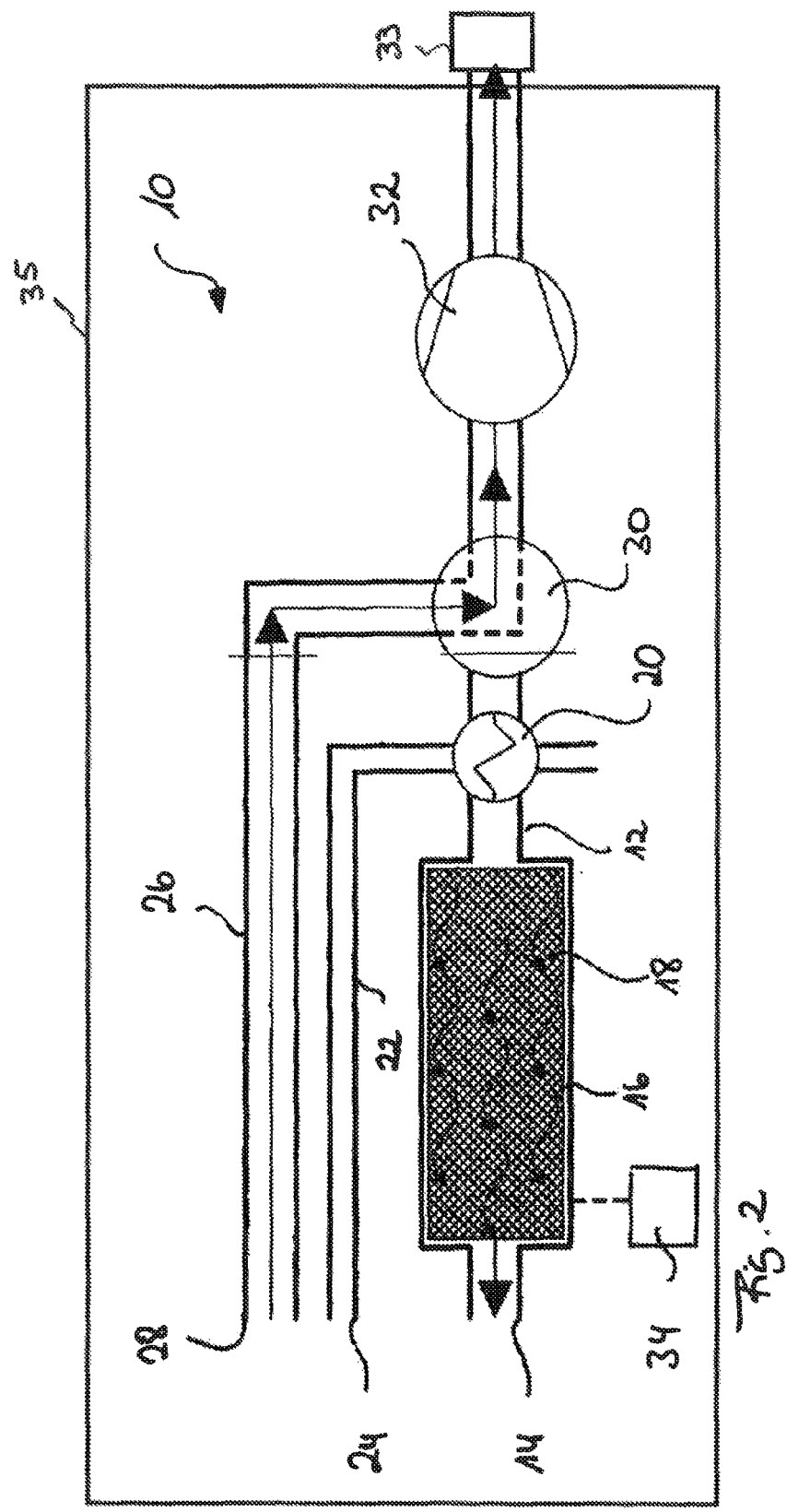

FIGS. 1 and 2 show an air conditioning system 10, which is integrated into an aircraft and comprises a fresh air line 12 that is connected to a fresh air inlet 14 disposed in the region of an aircraft skin. Through the fresh air inlet 14 ambient air from the aircraft environment may be fed into the fresh air line 12. The fresh air flowing through the fresh air line 12 may, depending on the operating state of the air conditioning system 10, be supplied to air conditioning units or to a mixer of the air conditioning system 10 or be conveyed directly into an aircraft area that is to be air-conditioned, such as for example a passenger cabin or a hold area. A structural block 33 generally representing the air conditioning units, mixer or aircraft area that is to be air-conditioned is shown in FIGS. 1-8.

In the fresh air line 12 a sorption device 16 configured in the form of an adsorption device is disposed, in relation to the direction of flow of the fresh air through the fresh air line 12, downstream of the fresh air inlet 14. The sorption device 16 contains a sorbent 18. As a sorbent a fine-pored material, for example activated carbon, zeolite, silica gel or the like, may be used. If fresh air supplied through the fresh air inlet 14 into the fresh air line 12 is conveyed through the sorption device 16, moisture contained in the fresh air attaches to the surface of the sorbent 18 contained in the sorption device 16. As a result, the moisture content of the fresh air flowing through the fresh air line 12 is reduced so that it is no longer necessary for the fresh air that is supplied through the fresh air line 12 to the air conditioning system 10 to be dehumidified by being correspondingly cooled in the air conditioning units of the air conditioning system 10. The cooling capacity demanded of the air conditioning units of the air conditioning system 10 may therefore be markedly reduced.

An air cooler 20 is disposed in the fresh air line 12, in relation to the direction of flow of the fresh air through the fresh air line 12, downstream of the sorption device 16. The air cooler 20 is configured in the form of a heat exchanger, through which flows ambient air that is supplied to the air cooler 20 through a cooling air line 22. The cooling air line 22 comprises a cooling air inlet 24 that is disposed in the region of the aircraft skin.

The air conditioning system 10 further comprises a fresh-air bypass line 26. The fresh-air bypass line 26 is provided with a further fresh air inlet 28 disposed in the region of the aircraft skin and opens out into the fresh air line 12, in relation to the direction of flow of the fresh air through the fresh air line 12, downstream of the air cooler 20 and hence also downstream of the sorption device 16. In the region where the fresh-air bypass line 26 opens out into the fresh air line 12 a 3-way valve 30 is disposed in the fresh air line 12. The 3-way valve 30 may, if desired, be a controllable valve with a variable cross section of flow and is used to control the supply of fresh air from a portion of the fresh air line 12 or the fresh-air bypass line 26 that is situated, in relation to the direction of flow of the fresh air through the fresh air line 12, upstream of the valve 30 into a portion of the fresh air line 12 that is situated, in relation to the direction of flow of the fresh air through the fresh air line 12, downstream of the valve 30.

Finally, a feed device 32 configured in the form of a blower or a compressor is disposed in the fresh air line 12. The feed device is positioned in the fresh air line 12, in relation to the direction of flow of the fresh air through the fresh air line 12, downstream of the valve 30 and is therefore capable of sucking fresh air both through the fresh air inlet 14 and the portion of the fresh air line 12 situated upstream of the valve 30 as well as through the further fresh air intake 28 and the fresh-air bypass line 26 into the portion of the fresh air line 12 situated downstream of the valve 30 and of feeding fresh air for example into the air conditioning units of the air conditioning system 10 and/or into an aircraft area that is to be air-conditioned, illustrated generally at 33.

The components of the air conditioning system 10 that are shown in the figures are disposed in an unpressurized area 35 of the aircraft, i.e. an area of the aircraft that is not maintained at a pressure higher than the ambient pressure when the aircraft is flying. In other words, in the aircraft area, in which the components of the air conditioning system 10 that are represented in the figures are disposed, a pressure corresponding substantially to the pressure in the aircraft environment prevails. The sorption device 16 in particular is moreover designed in such a way that a pressure compensation between the interior of the sorption device 16 and the aircraft area surrounding the sorption device 16 is always possible. In this way it is guaranteed that the sorbent 18 contained in the sorption device 16 is always exposed to the pressure that prevails also in the aircraft area accommodating the sorption device 16. As this aircraft area is not maintained at a pressure higher than the ambient pressure when the aircraft is flying, the sorbent is consequently exposed to the—in dependence upon the cruising altitude of the aircraft—correspondingly reduced ambient pressure when the aircraft is flying.

The sorption device 16 may moreover be thermally coupled to a heat source 34. As heat source 34 a heating device may be used. However, as heat source 34 use is preferably made of a heat source that is already present on board the aircraft and in particular releases thermal energy when the aircraft is flying. The sorption device 16 may be coupled selectively to the heat source 34, so that thermal energy from the heat source 34 may be supplied to the sorption device 16 temporarily, i.e. in specific operating situations.

When the aircraft is operating on the ground, then, as shown in FIG. 1, fresh air is sucked by means of the feed device 32 through the fresh air inlet 14 into the fresh air line 12. The fresh air supplied through the fresh air intake 14 into the fresh air line 12 is conveyed through the sorption device 16 and at the same time dehumidified. As a result of the adsorption heat that is released when the water contained in the fresh air flowing through the fresh air line 12 is adsorbed at the sorbent 18 of the sorption device 16, the fresh air is heated as it flows through the sorption device 16. In order to cool the heated fresh air exiting from the sorption device 16 back down to a desired low temperature, the fresh air after flowing through the sorption device 16 is therefore conveyed through the air cooler 20. In the air cooler 20 the fresh air is cooled back down to the ambient air temperature by means of the cooling energy that is provided by the unconditioned ambient air flowing through the cooling air line 22.

The supply of fresh air through the further fresh air intake 28 and the fresh-air bypass line 26 is however prevented by means of the 3-way valve 30. The operation of the air conditioning system 10 that is represented in FIG. 1, during which the entire fresh air stream conveyed through the fresh air line 12 into the air conditioning system 10 is conveyed through the sorption device 16 and at the same time dehumidified, is appropriate particularly in warm and humid ambient conditions.

When the aircraft is flying, as shown in FIG. 2, the air conditioning system 10 is on the other hand supplied with fresh air exclusively through the further fresh air intake 28 and the fresh-air bypass line 26. For this purpose, the valve 30 interrupts the connection between the portion of the fresh air line 12 situated upstream of the valve 30 and the portion of the fresh air line 12, and hence the feed device 32, situated downstream of the valve 30. The connection between the fresh-air bypass line 26 and the portion of the fresh air line 12 and hence the feed device 32 situated downstream of the valve 30 is, on the other hand, released by the valve 30.

As the components of the air conditioning system 10 that are shown in the figures are situated in an unpressurized aircraft area, an ambient pressure that is dependent upon the cruising altitude prevails in this aircraft area. At a cruising altitude of ca. 39,000 ft (ca. 11,900 m) the ambient pressure in the aircraft environment and hence the pressure in the aircraft area accommodating the components of the air conditioning system 10 shown in the figures is for example ca. 0.2 bar. As a result of the low ambient pressure acting upon the sorbent 18 contained in the sorption device 16, water molecules attached to the surface of the sorbent 18 are desorbed from the surface of the sorbent 18 and may be removed through the fresh air inlet 14 into the aircraft environment. Thus, when the aircraft is flying, a passive regeneration of the sorbent 18 contained in the sorption device 16 is possible. If desired or necessary, the regeneration of the sorbent 18 may be assisted by the supply of thermal energy from the heat source 34. This may be advantageous, for example if the aircraft is flying but is being operated with only short flight times, because the additional supply of thermal energy from the heat source 34 enables an acceleration of the regeneration of the sorbent 18. The supply of thermal energy from the heat source 34 therefore permits the regeneration of the sorbent 18 even in situations where the flight times are too short to guarantee a purely passive regeneration of the sorbent 18. If it is not possible for the sorbent 18 to be passively regenerated when the aircraft is flying, for example if the sorbent is in need of regeneration but the aircraft is to be operated on the ground, the sorbent 18 may also be regenerated exclusively by the supply of thermal energy from the heat source 34.

When the aircraft is operating on the ground in cold and dry ambient conditions, it is also possible, if desired, for a fraction of the fresh air to be supplied to the air conditioning system 10 to be supplied through the further fresh air intake 28 and the fresh-air bypass line 26 into the fresh air line 12. Finally, in particularly dry ambient conditions a ground operation of the aircraft is also conceivable, in which the fresh air supply into the fresh air line 12 is effected exclusively through the further fresh air intake 28 and the fresh-air bypass line 26.

Figure 3:
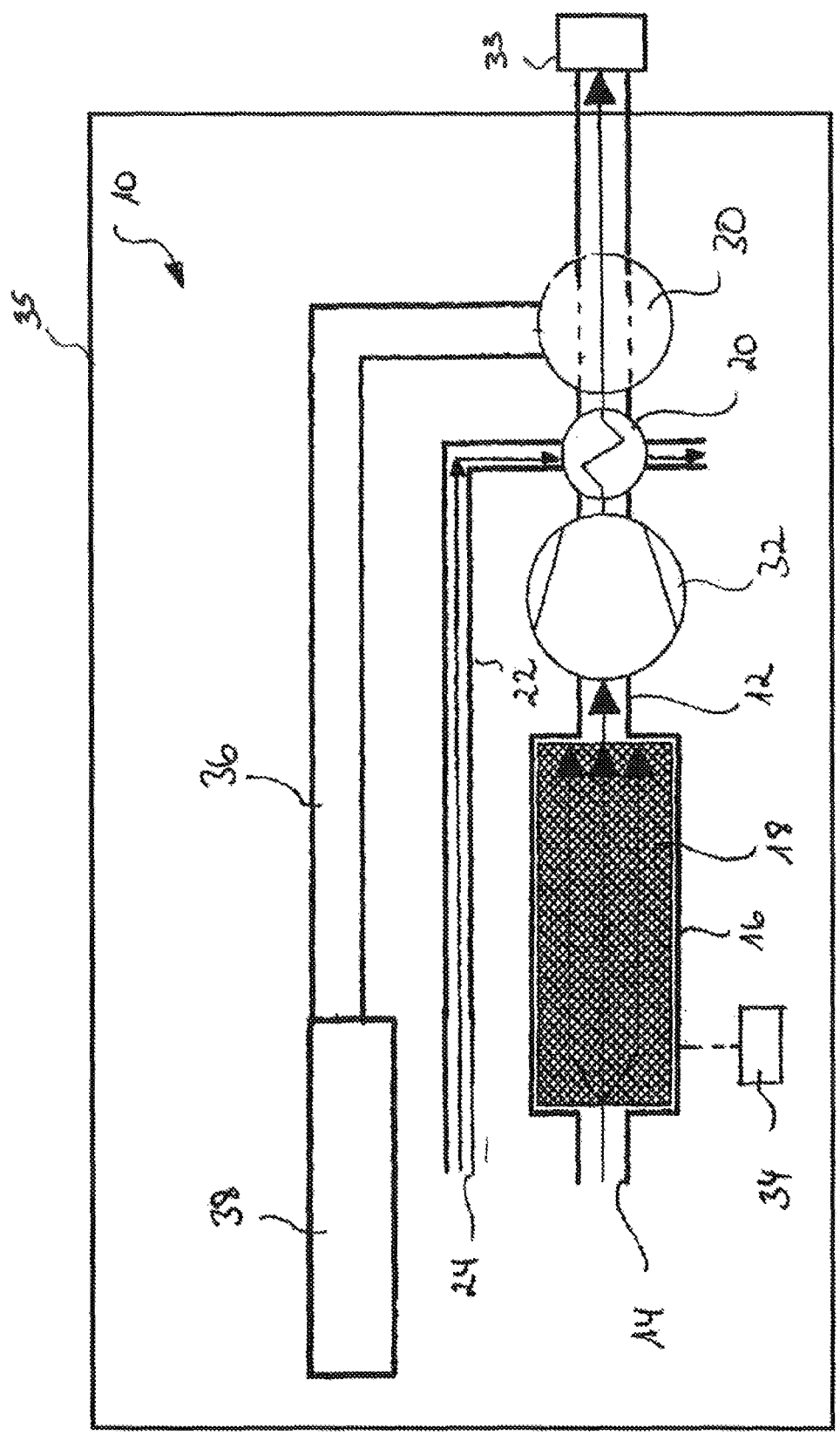
Figure 4:
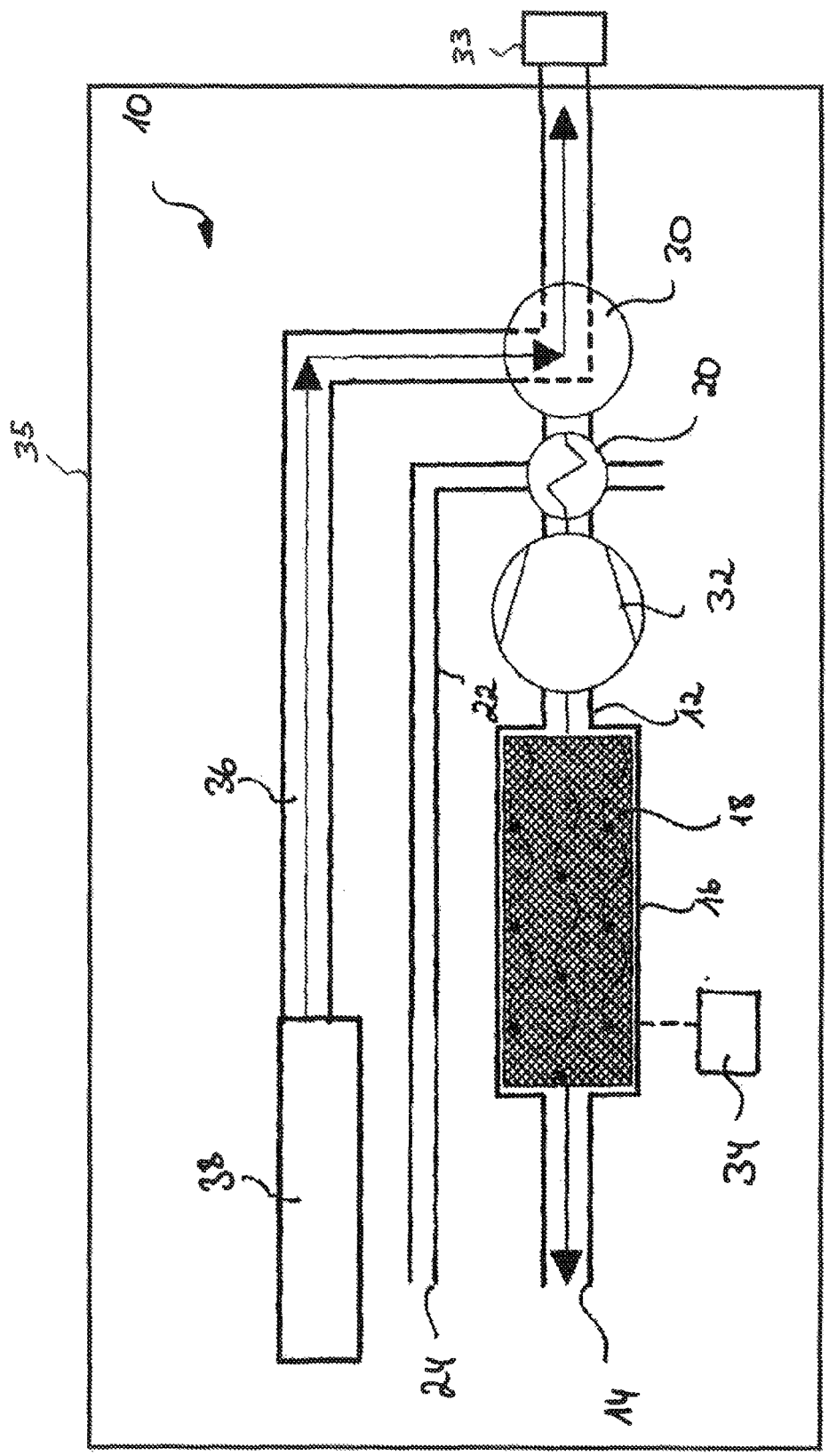

The air conditioning system 10 shown in FIGS. 3 and 4 differs from the arrangement according to FIGS. 1 and 2 in that the air conditioning system 10 is provided, not with a fresh-air bypass line, but with a bleed air line 36. The bleed air line 36 is connected to an engine compressor 38 and opens out into the fresh air line 12, in relation of the direction of flow of the fresh air through the fresh air line 12, downstream of the air cooler 20 and hence also downstream of the sorption device 16. In a similar fashion to the arrangement represented in FIGS. 1 and 2, a 3-way valve 30 disposed in the region where the bleed air line 36 opens out into the fresh air line 12 is used to control the supply of air from the portion of the fresh air line 12 and/or bleed air line 36 situated, in relation to the direction of flow of the fresh air through the fresh air line 12, upstream of the valve 30 into the portion of the fresh air line 12 situated, in relation to the direction of flow of the fresh air through the fresh air line 12, downstream of the valve 30.

In the air conditioning system 10 shown in FIGS. 3 and 4 the feed device 32 is needed only to feed fresh air through the fresh air inlet 14 into the fresh air line 12 and is therefore disposed in the fresh air line 12 between the sorption device 16 and the air cooler 20. Alternatively, the feed device 32 might be positioned in the fresh air line 12 between the air cooler 20 and the valve 30.

When the aircraft is operating on the ground, in particular with the engines switched off, ambient air is sucked by means of the feed device 32 through the fresh air inlet 14 into the fresh air line 12. The air, as it flows through the sorption device 16, is dehumidified. The air cooler 20 is again used to cool the fresh air, which is heated as it flows through the sorption device 16, with ambient air that is conveyed through the cooling air inlet 24 into the cooling air line 22 again being used as a cooling energy source. The valve 30 is situated in a position, in which it blocks off the bleed air line 36 from the fresh air line 12.

When the aircraft is flying, on the other hand, the air conditioning system 10 is supplied with air through the bleed air line 36. The valve 30 blocks off the portion of the fresh air line 12 situated upstream of the valve 30 from the portion of the fresh air line 12 situated downstream of the valve 30. As already described in connection with FIGS. 1 and 2, as a result of the low ambient pressure acting upon the sorbent 18 of the sorption device 16 a desorption of the water molecules attached to the surface of the sorbent 18 and hence a passive regeneration of the sorbent 18 occurs. The water desorbed from the surface of the sorbent 18 may be removed through the fresh air inlet 14 into the aircraft environment. If desired or necessary, the regeneration of the sorbent 18 may be assisted by the supply of thermal energy from the heat source 34. Furthermore, if need be, as in the arrangement according to FIGS. 1 and 2, a regeneration of the sorbent 18 is possible exclusively by the supply of thermal energy from the heat source 34.

When the aircraft is operating on the ground with the engines switched on, the valve 30 may be moved into a position, in which it enables both the supply of fresh air through the portion of the fresh air line situated upstream of the valve 30 and the supply of engine bleed air through the bleed air line 36 into the portion of the fresh air line 12 situated downstream of the valve 30. Finally, when the aircraft is operating on the ground with the engines switched on, an operation of the air conditioning system 10 is also possible, in which the valve 30 blocks off the portion of the fresh air line 12 situated upstream of the valve 30 from the portion of the fresh air line 12 situated downstream of the valve 30 and the air supply into the portion of the fresh air line 12 situated downstream of the valve 30 is effected exclusively through the bleed air line 36.

Otherwise the layout and function of the air conditioning system 10 represented in FIGS. 3 and 4 correspond to the layout and function of the arrangement according to FIGS. 1 and 2.

The air conditioning system 10 shown in FIGS. 5 to 8 differs from the arrangement according to FIGS. 3 and 4 in that the air conditioning system 10, in addition to a bleed air line 36, is also provided with a fresh-air bypass line 26. The bleed air line 36 is again connected to an engine compressor 38 and opens out into the fresh air line 12, in relation to the direction of flow of the fresh air through the fresh air line 12, downstream of the feed device 32 and hence also downstream of the sorption device 16. In a similar fashion to the arrangement represented in FIGS. 3 and 4, a 3-way valve 30a disposed in the region where the bleed air line 36 opens into the fresh air line 12 is used to control the supply of air from the portion of the fresh air line 12 and/or the bleed air line 36 situated, in relation to the direction of flow of the fresh air through the fresh air line 12, upstream of the valve 30a into the portion of the fresh air line 12 situated, in relation to the direction of flow of the fresh air through the fresh air line 12, downstream of the valve 30a.

The fresh-air bypass line 26 is provided with a further fresh air inlet 28 disposed in the region of the aircraft skin and opens out into the fresh air line 12, in relation to the direction of flow of the fresh air through the fresh air line 12, downstream of the air cooler 20 and hence also downstream of the sorption device 16, but upstream of the feed device 32. In the region where the fresh-air bypass line 26 opens out into the fresh air line 12 a 3-way valve 30b is disposed in the fresh air line 12 and is used to control the supply of fresh air from a portion of the fresh air line 12 and/or the fresh-air bypass line 26 situated, in relation to the direction of flow of the fresh air through the fresh air line 12, upstream of the valve 30b into a portion of the fresh air line 12 situated, in relation to the direction of flow of the fresh air through the fresh air line 12, downstream of the valve 30b.

Figure 5:
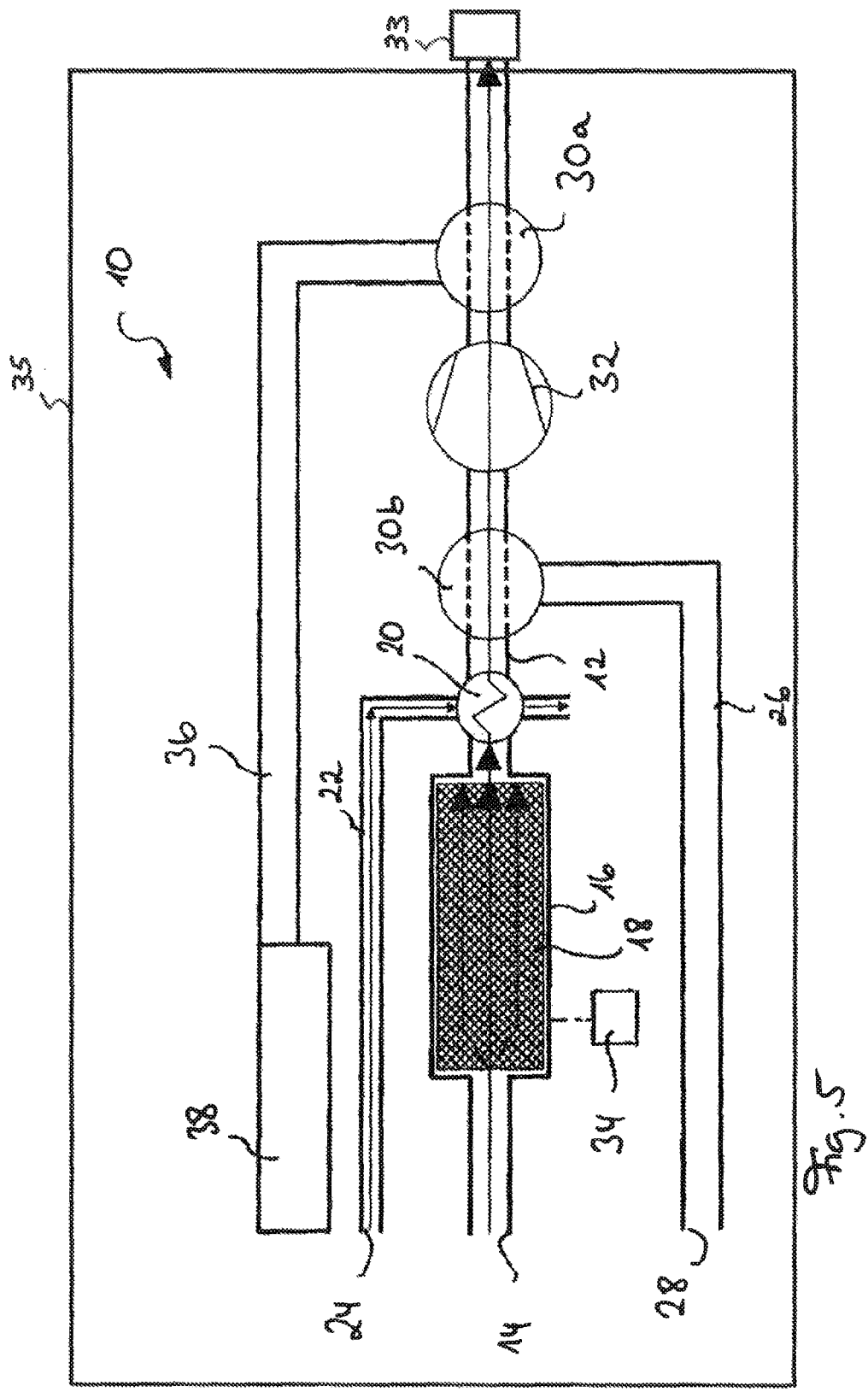

When the aircraft is operating on the ground, with the engines switched off and in humid ambient conditions, then, as shown in FIG. 5, ambient air is sucked by means of the feed device 32 through the fresh air inlet 14 into the fresh air line 12. The air, as it flows through the sorption device 16, is dehumidified. The air cooler 20 is again used to cool the fresh air, which is heated as it flows through the sorption device 16, with ambient air that is conveyed through the cooling air inlet 24 into the cooling air line 22 again being used as a cooling energy source. The valves 30a, 30b are situated in a position, in which they block off the bleed air line 36 and the fresh-air bypass line 26 from the fresh air line 12.

Figure 6:
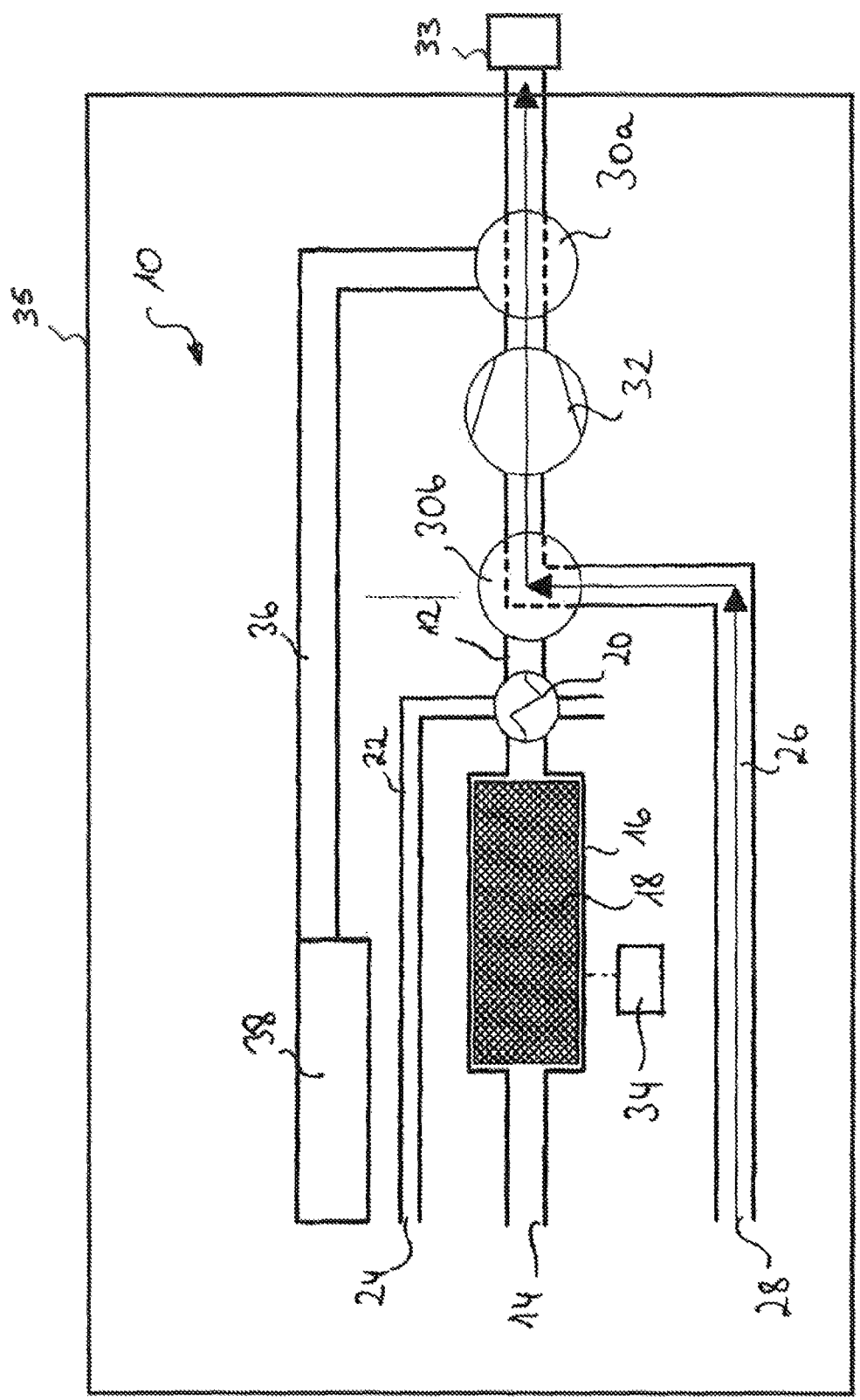
Figure 7:
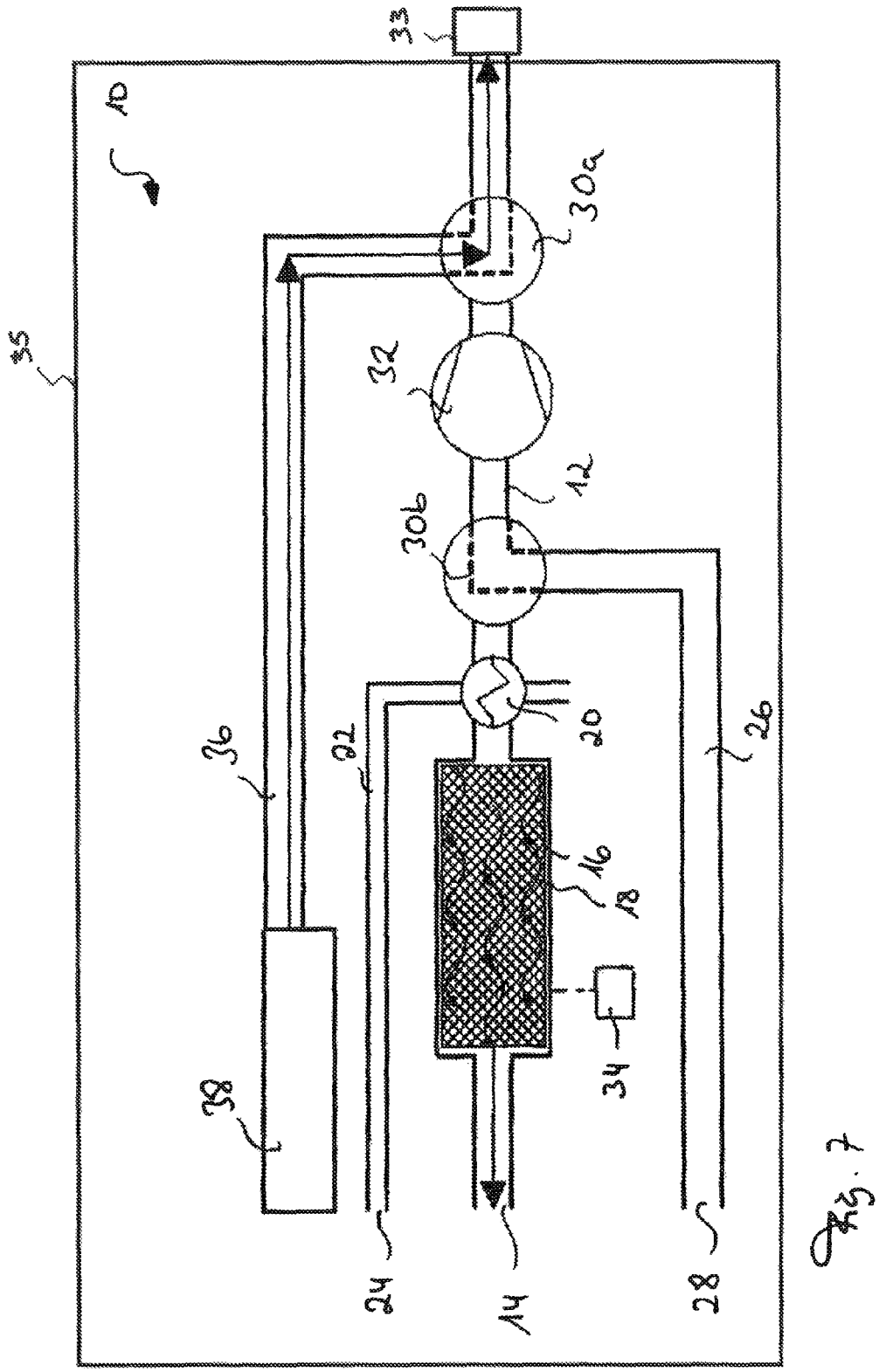

When the aircraft is operating on the ground, with the engines switched off but in dry ambient conditions, then, as represented in FIG. 6, the feed device 32 sucks ambient air through the further fresh air inlet 28 and the fresh-air bypass line 26 into the fresh air line 12. The valve 30b connects the fresh-air bypass line 26 to the fresh air line 12 and blocks off the portion of the fresh air line 12 situated, in relation to the direction of flow of the fresh air through the fresh air line 12, upstream of the valve 30b from the portion of the fresh air line situated downstream of the valve 30b. The valve 30a on the other hand is situated in a position, in which it blocks off the bleed air line 36 from the fresh air line 12.

Figure 8:
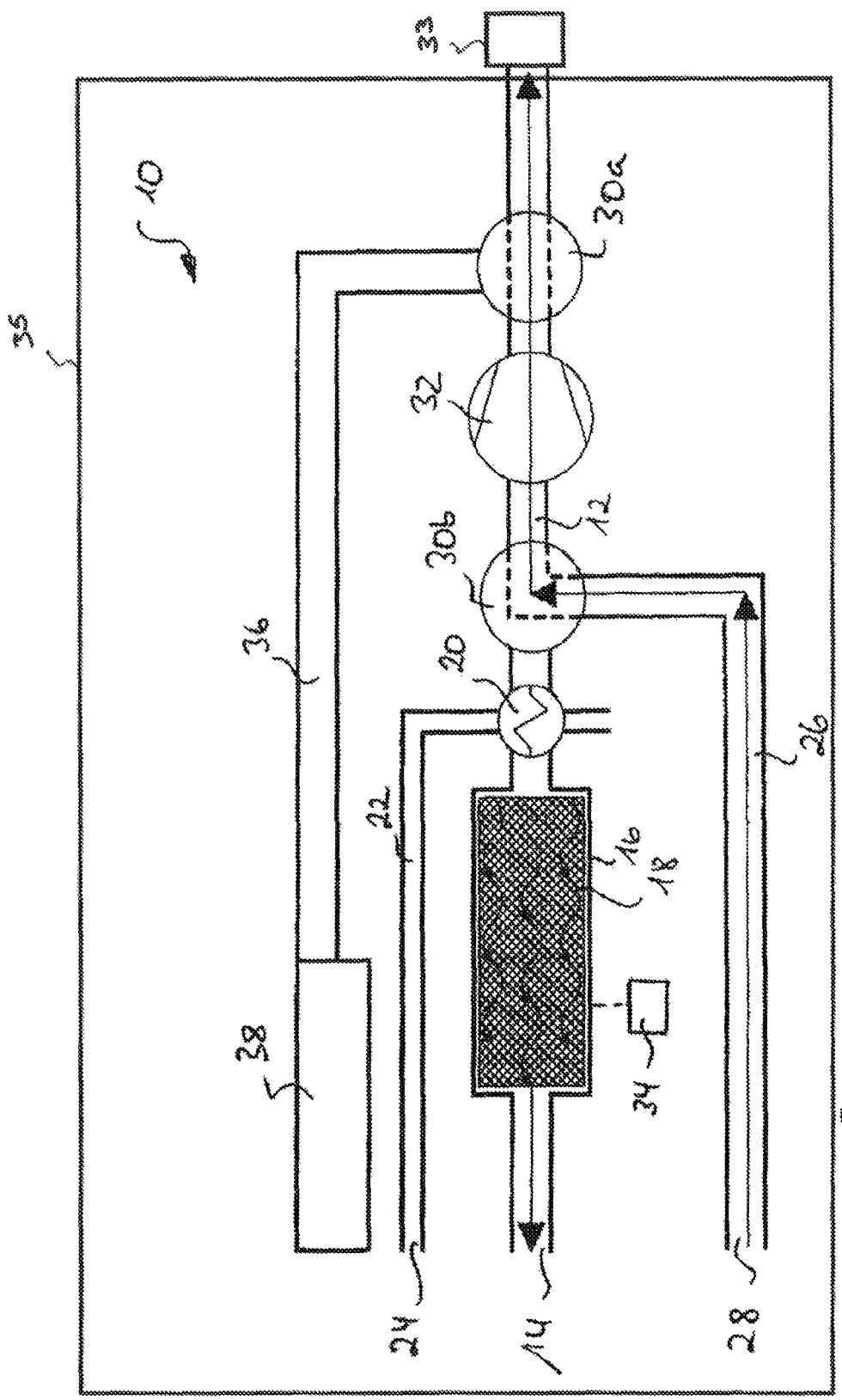

When the aircraft is flying, the air conditioning system 10 may be supplied with air either through the bleed air line 36 (see FIG. 7) or through the fresh-air bypass line 26 (see FIG. 8). If the air conditioning system 10 is supplied with bleed air through the bleed air line 36, the valve 30a connects the bleed air line 36 to the fresh air line 12 but blocks off the portion of the fresh air line 12 situated upstream of the valve 30a from the portion of the fresh air line 12 situated downstream of the valve 30a. If, on the other hand, the air conditioning system 10 is supplied with ambient air through the fresh-air bypass line 26, the valve 30b connects the fresh-air bypass line 26 to the fresh air line 12 but blocks off the portion of the fresh air line 12 situated upstream of the valve 30b from the portion of the fresh air line 12 situated downstream of the valve 30a. The valve 30a is situated in a position, in which it blocks off the bleed air line 36 from the fresh air line 12.

As already described in connection with FIGS. 1 to 4, when the aircraft is flying, as a result of the low ambient pressure acting upon the sorbent 18 of the sorption device 16 a desorption of the water molecules attached to the surface of the sorbent 18 and hence a passive regeneration of the sorbent 18 occurs. The water desorbed from the surface of the sorbent 18 may be removed through the fresh air inlet 14 into the aircraft environment. If desired or necessary, the regeneration of the sorbent 18 may be assisted by the supply of thermal energy from the heat source 34. Furthermore, if need be, as in the arrangement according to FIGS. 1 to 4 a regeneration of the sorbent 18 is possible exclusively by the supply of thermal energy from the heat source 34.

Otherwise, the layout and function of the air conditioning system 10 represented in FIGS. 5 to 8 correspond to the layout and function of the arrangement according to FIGS. 3 to 4.

FIGS. 1 to 8 show in each case an air conditioning system 10 that is integrated into an aircraft. As an alternative thereto it is however also conceivable to integrate the air conditioning system 10 into an external aircraft air conditioning system, which is connectable to an aircraft situated on the ground in order to supply conditioning air to areas of the aircraft that are to be air-conditioned. The air conditioning system 10 may then be configured without the bleed air line 36. Alternatively it is possible to equip the air conditioning system 10 with a compressor for generating compressed air and provide, instead of the bleed air line 36, a compressed-air line connected to the compressor.

Furthermore, FIGS. 1 to 8 show an embodiment of the air conditioning system 10 that has a sorption device 16 permanently integrated into the air conditioning system 10. As an alternative thereto, the sorption device 16 may be configured as a component that is connectable only temporarily to the air conditioning system 10. A sorption device 16 configured in this way may be connected both to an air conditioning system 10 integrated into an aircraft and to an air conditioning system 10 integrated into an external aircraft air conditioning system.

The invention claimed is:

1. An aircraft air conditioning system carried by an aircraft, the aircraft air conditioning system comprising:
   a fresh air line connected to a fresh air inlet disposed in an unpressurized area of the aircraft for supplying unpressurized fresh air from an ambient environment surrounding the aircraft to an air conditioning unit or an area inside the aircraft to be air-conditioned, and
   a sorption device operatively disposed in the fresh air line between the fresh air inlet and the air conditioning unit or area inside the aircraft to be air-conditioned, the sorption device containing a sorbent for taking up moisture from unpressurized fresh air flowing through the fresh air line from the fresh air inlet,
   a valve operatively disposed in the fresh air line between the sorption device and the air conditioning unit or area inside the aircraft to be air-conditioned, the valve having an open position that allows flow of fresh air through the fresh air line from the sorption device to the air conditioning unit or area inside the aircraft to be air-conditioned and a closed position that prevents flow of fresh air through the fresh air line from the sorption device to the air conditioning unit or area inside the aircraft to be air-conditioned, the valve switches to the open position when the aircraft is operating on the ground, and the valve switches to the closed position when the aircraft is flying to expose the sorbent contained in the sorption device to ambient pressure surrounding the aircraft via the fresh air inlet while preventing the flow of fresh air through the fresh air line from the sorption device to the air conditioning unit or area inside the aircraft to be air-conditioned for the purpose of regeneration of the sorbent, and a heat source operatively thermally connected to the sorption device, the heat source supplies thermal energy to the sorbent contained in the sorption device when the valve is closed to assist the regeneration of the sorbent.

2. An aircraft air conditioning system according to claim 1 further comprising an air cooler operatively disposed in the fresh air line between the sorption device and the air conditioning unit or area inside the aircraft to be air-conditioned.

3. An aircraft air conditioning system according to claim 1 further comprising a fresh-air bypass line connected to a further fresh air inlet for supplying unpressurized fresh air from the ambient environment surrounding the aircraft to the air conditioning unit or area inside the aircraft to be air-conditioned and which opens out into the fresh air line between the sorption device and the air conditioning unit or area inside the aircraft to be air-conditioned.

4. An aircraft air conditioning system according to claim 1 further comprising a compressor operatively disposed along the fresh air line between the sorption device and the air conditioning unit or area inside the aircraft to be air-conditioned, the compressor feeds the unpressurized fresh air through the fresh air line toward the air conditioning unit or area inside the aircraft to be air-conditioned.

5. A method of operating an aircraft air conditioning system carried by an aircraft, the method comprising:
conveying unpressurized fresh air from an ambient environment surrounding the aircraft to an air conditioning unit or area inside the aircraft to be air-conditioned through a fresh air line connected to a fresh air inlet disposed in an unpressurized area of the aircraft,
taking up moisture from the fresh air flowing through the fresh air line with a sorbent is contained in a sorption device operatively disposed in the fresh air line between the fresh air inlet and the air conditioning unit or area inside the aircraft to be air-conditioned,
simultaneously exposing the sorbent contained in the sorption device to ambient pressure surrounding the aircraft via the fresh air inlet and preventing flow of fresh air from the sorption device to the air conditioning unit or area inside the aircraft to be air-conditioned when the aircraft is flying for the purpose of regeneration of the sorbent, and
supplying thermal energy from a heat source to the sorbent contained in the sorption device when the aircraft is flying and while simultaneously exposing the sorbent to the ambient pressure surrounding the aircraft via the fresh air inlet and preventing flow of fresh air from the sorption device to the air conditioning unit or area inside the aircraft to be air-conditioned to assist the regeneration of the sorbent.

6. A method according to claim 5, further comprising cooling the unpressurized fresh air flowing through the fresh air line with an air cooler disposed in the fresh air line between the sorption device and the air conditioning unit or area inside the aircraft to be air-conditioned.

7. A method according to claim 5, further comprising conveying unpressurized fresh air from the ambient environment surrounding the aircraft through a fresh-air bypass line, connected to a further fresh air inlet, from the further fresh air inlet into the fresh air line in an area of the fresh air line between the sorption device and the air conditioning unit or area inside the aircraft to be air-conditioned.

8. A method according to claim 5, further comprising feeding the unpressurized fresh air through the fresh air line to the air conditioning unit or area inside the aircraft to be air-conditioned with a feed device operatively disposed in the fresh air line between the sorption device and the air conditioning device or area inside the aircraft to be air-conditioned.

9. An aircraft comprising an air conditioning system according to claim 1.

10. An aircraft according to claim 9 wherein the sorption device is disposed in an unpressurized area of the aircraft.

11. An aircraft according to claim 9 wherein the aircraft air conditioning system comprises a bleed air line connected to one of an engine compressor and an auxiliary engine compressor of the aircraft and opening into the fresh air line between the sorption device and the air conditioning device or area inside the aircraft to be air-conditioned.

12. A method of operating an aircraft carrying an aircraft air conditioning system, the method comprising:
conveying unpressurized fresh air from an ambient environment surrounding the aircraft to an air conditioning unit or area inside the aircraft to be air-conditioned through a fresh air line connected to a fresh air inlet disposed in an unpressurized area of the aircraft,
taking up moisture from the unpressurized fresh air flowing through the fresh air line with a sorbent contained in a sorption device operatively disposed in the fresh air line between the fresh air inlet and the air conditioning unit or area inside the aircraft to be air-conditioned,
conveying bleed air with an engine compressor or an auxiliary engine compressor through a bleed air line and into the fresh air line in an area of the fresh air line between the sorption device and the air conditioning unit or area inside the aircraft to be air-conditioned,
regenerating the sorbent contained in the sorption device by simultaneously exposing the sorbent to ambient pressure surrounding the aircraft via the fresh air inlet and preventing flow of fresh air from the sorption device to the air conditioning unit or area inside the aircraft to be air-conditioned when the aircraft flying, and
supplying thermal energy from a heat source to the sorbent contained in the sorption device when the aircraft is flying while simultaneously exposing the sorbent contained in the sorption device to the ambient pressure surrounding the aircraft via the fresh air inlet and preventing flow of fresh air from the sorption device to the air conditioning unit or area inside the aircraft to be air-conditioned to assist regeneration of the sorbent.

13. An aircraft air conditioning system according to claim 3, wherein the valve, in the open position, directs the flow of unpressurized fresh air from the fresh air inlet through the sorption device and the fresh air line to the air conditioning unit or area inside the aircraft to be air-conditioned, and wherein the valve, in the closed position, directs the flow of unpressurized fresh air from the further fresh air inlet through the fresh-air bypass line and the fresh air line to the air conditioning unit or area inside the aircraft to be air-conditioned while preventing air flow through the sorption device.

14. A method according to claim 7, further comprising:

directing the flow of unpressurized fresh air from at least the fresh air inlet through the sorption device and the fresh air line to the air conditioning unit or area inside the aircraft to be air-conditioned when the aircraft is operating on the ground, and directing the flow of unpressurized fresh air from the further fresh air inlet through the fresh-air bypass line and the fresh air line to the air conditioning unit or area inside the aircraft to be air-conditioned while preventing air flow through the sorption device when the aircraft is flying.

15. A method according to claim 12, further comprising:

directing the flow of unpressurized fresh air from the fresh air inlet through the sorption device and the fresh air line to the air conditioning unit or area inside the aircraft to be air-conditioned when the aircraft is operating on the ground, and directing the flow of bleed air from the engine compressor or auxiliary engine compressor of the aircraft through the bleed air line and the fresh air line to the air conditioning unit or area inside the aircraft to be air-conditioned while preventing air flow from the sorption device through the fresh air line to the air conditioning unit or area inside the aircraft to be air-conditioned when the aircraft is flying.

\* \* \* \* \*